United States Patent [19]
Yamazaki et al.

[11] Patent Number: 5,739,833
[45] Date of Patent: Apr. 14, 1998

[54] JET PRINTING INK AND PRINTING METHOD USING THE INK

[75] Inventors: Hideto Yamazaki, Nagoya; Shunichi Higashiyama, Yokkaichi, both of Japan

[73] Assignee: Brother Kogyo Kabushiki Kaisha, Nagoya, Japan

[21] Appl. No.: 489,369

[22] Filed: Jun. 12, 1995

[30] Foreign Application Priority Data

Jun. 23, 1994 [JP] Japan .................................. 6-141561

[51] Int. Cl.$^6$ .............................. C09D 11/00; B41J 2/05; H04N 1/034
[52] U.S. Cl. ............................................ 347/100; 347/20
[58] Field of Search ................................ 347/100, 20

[56] References Cited

U.S. PATENT DOCUMENTS

| | | |
|---|---|---|
| 4,339,763 | 7/1982 | Kyser et al. . |
| 5,010,125 | 4/1991 | Kruse et al. . |
| 5,016,028 | 5/1991 | Temple . |
| 5,112,398 | 5/1992 | Kruse . |
| 5,159,349 | 10/1992 | Endo et al. . |

FOREIGN PATENT DOCUMENTS

| | | |
|---|---|---|
| A-3-234772 | 10/1991 | Japan . |
| WO-A-9212209 | 7/1992 | WIPO . |

*Primary Examiner*—Daniel P. Malley
*Attorney, Agent, or Firm*—Oliff & Berridge, PLC

[57] ABSTRACT

An ink which is usable with an ink jetting device for jetting the ink through a nozzle so as to effect printing on a recording medium. The ink contains a pigment as a coloring agent, and a non-aqueous solvent as an ink solvent. The pigment is in the form of particles having an average particle size of X μm. The ink is jetted from the ink jetting device at a rate of Y, where Y is the volume (pl) of the ink which is ejected from the nozzle each time the ink jetting device is energized. The above-indicated X and Y satisfy the following formulas:

$$0.05 \leq X \leq 0.5,$$

$$10 \leq Y \leq 100X+50, \text{ and}$$

$$100X-30 \leq Y.$$

7 Claims, 1 Drawing Sheet

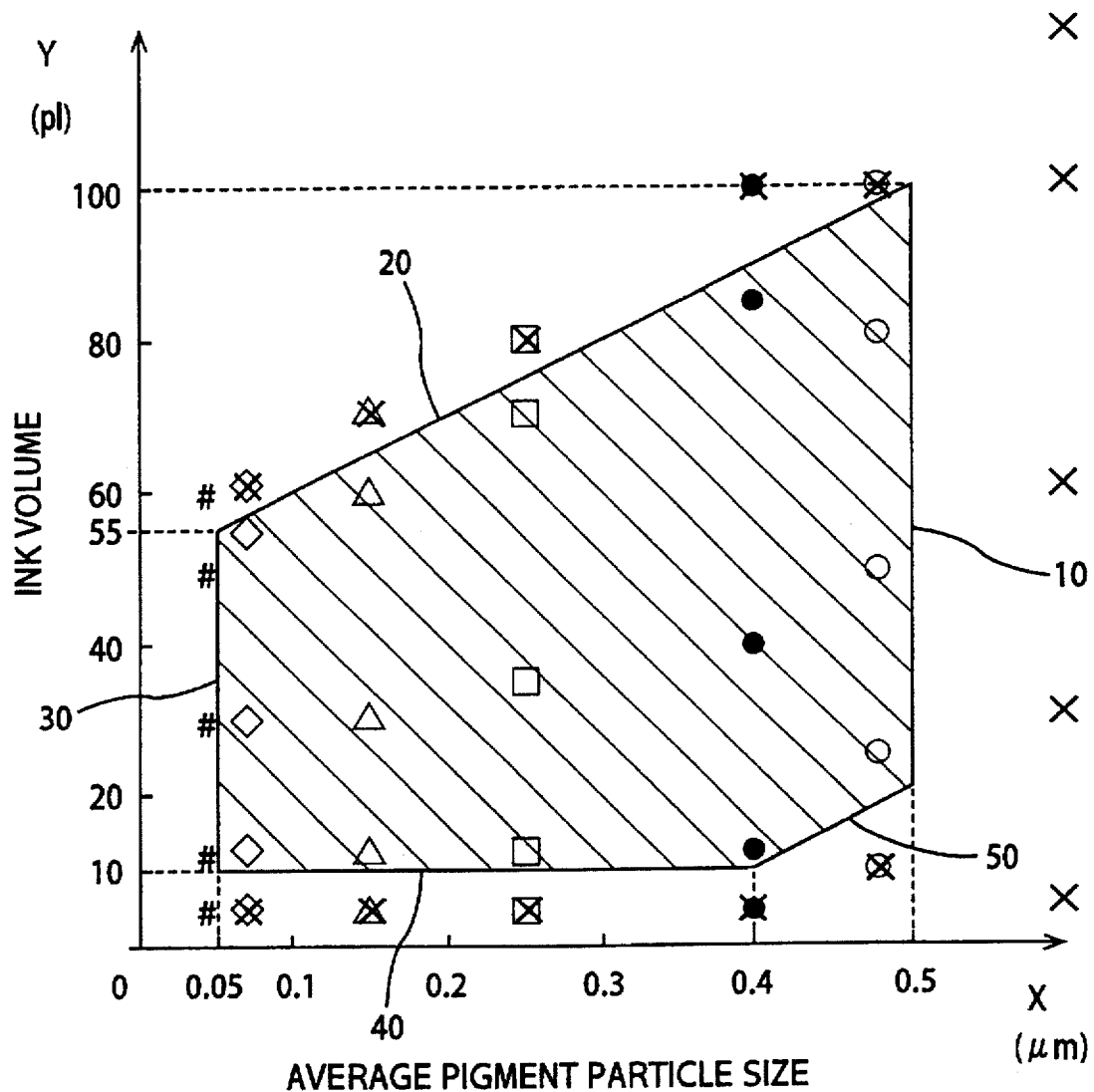

5,739,833

JET PRINTING INK AND PRINTING METHOD USING THE INK

BACKGROUND OF THE INVENTION

1. Field of the Invention

The present invention relates to a jet printing ink containing a pigment or pigments as a coloring agent, and a non-aqueous solvent for dissolving the pigment(s), for use in an ink jet printer for printing images on a recording medium, by jetting the ink through a small orifice or jet nozzle formed through a printhead of the printer.

2. Discussion of Related Art

Conventionally, an aqueous dye ink composition, in which a dye as a coloring agent is dissolved in water, is widely used as a jet printing ink for use in an ink jet printer. To produce the ink composition, various kinds of water-soluble dyes are dissolved in water or a water-soluble organic solvent, and various additives are added as needed to the solution. However, the aqueous dye ink composition thus obtained exhibits insufficient water-fastness and light-fastness, leaving some room for improvements.

In view of the above, there has been developed in recent years an ink composition containing a pigment, which exhibits higher water-fastness and light-fastness, as compared with the dye as described above. This ink composition is generally classified into two types, that is, an aqueous pigment ink and a non-aqueous pigment ink.

Since the aqueous pigment ink has a considerably low viscosity, misting or the production of small droplets may occur when the ink is used in the ink jet printer, resulting in poor print quality. Further, the aqueous pigment ink consists principally of water, and thus exhibits a considerably high vapor pressure. Therefore, the ink is likely to dry, resulting in clogging of jet nozzles of the printhead. To solve these problems, ethylene glycol or its derivative may be added as a solvent. In this case, however, the ink generally has a relatively high viscosity, which varies significantly with temperature, and thus requires relatively more energy for production of ink droplets. The ink of this type also tends to produce bubbles, which are difficult to be removed from small orifices of the printhead, and thus significantly affect print quality.

Some examples of the non-aqueous pigment ink are disclosed in U.S. Pat. No. 5,010,125 and U.S. Pat. No. 5,112,398. The characteristics of the non-aqueous pigment ink vary to a great extent, depending upon the kind of the organic solvent used as an ink solvent. When propylene glycol or its derivative is used as the ink solvent, for example, the obtained ink has a relatively small viscosity, which is not higher than 30 centipoises even at ordinary temperature and has a small temperature dependency, thereby requiring relatively small energy for production of ink droplets. Nevertheless, misting does not occur upon ink jet printing, due to the higher viscosity of the solvent than that of water. Further, the ink having the propylene glycol solvent is not likely to dry, thereby preventing clogging of the jet nozzles, due to the lower vapor pressure of the solvent than that of water. Since the solvent also has a relatively low surface tension, the resulting ink is rapidly absorbed by paper fibers on a paper surface, without rendering the printed surface of the paper wet and sticky. Further, the ink is much less likely to produce bubbles, due to relatively low air solubility of the above solvent.

However, the non-aqueous pigment ink has some problems due to the relatively low surface tension as described above. That is, if the size of pigment particles dispersed in the ink is small, the pigment particles and the non-aqueous solvent tend to spread widely over the paper fibers, resulting in blurring of printed images. If the size of the pigment particles is large, on the other hand, the storage stability (or shelf life) of the ink is deteriorated as it is stored for a relatively long period of time. Although the blurring of the printed images may be reduced by using a reduced amount of droplets for ink jet printing, this may result in reduced color intensity. With an increased amount of droplets of the ink used, the blurring gets worse due to the low surface tension of the non-aqueous solvent.

SUMMARY OF THE INVENTION

It is therefore an object of the present invention to provide a jet printing ink for use in a ink jet printer, which exhibits excellent stability even after it is stored for a long period of time, and provides high-quality printed images.

The above object may be accomplished according to the principle of the present invention, which provides an ink usable with an ink jetting device for jetting the ink through a nozzle so as to effect printing on a recording medium, the ink comprising a pigment as a coloring agent, and a non-aqueous solvent as an ink solvent, the pigment comprising particles having an average particle size of X μm, the ink being jetted from the ink jetting device at a rate of Y, where Y is a volume of the ink as measured in picoliter (pl) which is ejected from the nozzle each time the ink jetting device is energized, these X and Y satisfying the following formulas:

$$0.05 \leq X \leq 0.5,$$

$$10 \leq Y \leq 100X+50, \text{ and}$$

$$100X-30 \leq Y.$$

The ink jetting device is capable of jetting or ejecting the above-described ink from the device, with high operating stability, to produce high quality images. Further, the ink of the invention exhibits high storage stability even after it is stored for a long period of time.

In one preferred form of the invention, the non-aqueous solvent is a low-volatile organic solvent having a surface tension of not higher than 37 dyn/cm, and a vapor pressure of not higher than 10 mmHg at 20° C.

The above-indicated low-volatile organic solvent as the ink solvent may be preferably selected from propylene glycol and its derivatives, aliphatic hydrocarbons and dibasic acid ester.

BRIEF DESCRIPTION OF THE DRAWING

The foregoing objects and other advantages of the invention will be apparent on reading the following description in conjunction with the single drawing, which is a graph showing the relationship between an average particle size of pigment particles of an ink according to each example, and the volume (pl) of the ink ejected from one nozzle of an ink jet printhead per energization of an actuator corresponding to the nozzle.

DETAILED DESCRIPTION OF THE INVENTION

A jet printing ink according to one embodiment of the present invention consists principally of a non-aqueous solvent and a pigment, to which a dispersant, a resin and others are added as needed. The pigment serves as a coloring component of the ink. The dispersant serves to disperse particles of the pigments in the solvent, while the resin prevents agglomeration or coagulation of the pigment particles, and also improves water-fastness of the ink after printing.

The pigment may be either an inorganic pigment or an organic pigment. A pigment used for production of black-and-white images may be selected from: carbon blacks, such as furnace black, lamp black, acetylene black, and channel black, metal oxides such as titanium oxide, and organic pigments such as orthonitroaniline black. Pigments used for production of color images may be selected from: Toluidine Red, Permanent Carmine FB, Fast Yellow AAA, Disazo Orange PMP, Lake Red C, Brilliant Carmine 6B, Phthalocyanine Blue, quinacridone red, Dioxane Violet, Victoria Pure Blue, Alkali Blue Toner, Fast Yellow 10G, Disazo Yellow AAOT, Disazo Yellow AAMX, Disazo Yellow HR, Disazo Yellow AAOA, yellow iron oxide, orthonitroaniline orange, Dinitroaniline Orange, Vulcan Orange, Toluidine Red, chlorinated Para Red, Brilliant First Scarlet, Naphthol Red 23, Pyrazolone Red, barium red 2B, calcium red 2B, strontium red 2B, manganese red 2B, Barium Lithol Red, Pigment Scarlet 3B Lake, Lake Bordeaux 10B, Ansosine 3B Lake, Ansosine 5B Lake, Rhodamine 6G Lake, eosine lake, red iron oxide, Faphtol Red FGR, Rhodamine B Lake, Methyl Violet Lake, dioxazine violet, Basic Blue 5B Lake, Basic Blue 6G Lake, Fast Sky Blue, Alkali Blue R Toner, Peacock Blue Lake, prussian blue, ultramarine, Reflex Blue 2G, Reflex Blue R, Brilliant Green Lake, Diamond Green Thioflavine Lake, Phthalocyanine Green G, Green Gold, Phthalocyanine Green Y, iron oxide, rust powder, zinc flower, titanium oxide, calcium carbonate, clay, barium sulfate, alumina white, aluminum, bronze, daylight fluorescent pigment, pearl pigment, Naphthol Carmine FB, Naphthol Red M, Permanent Carmine FB, Fast Yellow G, Disazo Yellow AAA, Alkali Blue G Toner, and others, and processed pigments, such as graft carbon, which are coated with a resin, for example.

The dispersant may be selected from ionic (anionic and cationic) surfactacts, amphoteric surfactacts, nonionic surfactacts, high molecular surfactacts, and high molecular compounds, for example.

The anionic surfactacts include alkyl sulfates and higher alkyl ether sulfates, more specifically, ammonium lauryl sulfate, and sodium polyoxyethylene lauryl ether sulfate, for example.

The cationic surfactacts include aliphatic ammonium salts and amine salts, more specifically, alkyl trimethylammonium, and polyoxyethylene alkyl amine, for example.

The amphoteric surfactacts may be of betain type, such as alkyl dimethyl betain, or of oxido type, such as alkyl dimethyl amine oxido, for example.

The nonionic surfactacts include glycol fatty acid ester, propylene glycol fatty acid ester, sorbitan fatty acid ester, polyoxyethylene sorbitan fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, higher fatty acid alcohol ester, polyhydric alcohol fatty acid ester, and others.

The high molecular surfactacts and high molecular compounds include high molecular weight polyurethane, polyester, high molecular polymer including a functional group, such as carbonyl group or amino group, which has a strong affinity for the pigment.

The resin may be suitably selected from vinyl resin, alkyl resin, acrylic resin, polyurethane, rosin ester and others, so that the selected resin does not precipitate or gel at jet printer operating temperatures or at room temperature once it is dissolved in the solvent.

The jet printing ink according to the present invention contains 3–20%, preferably, 5–15% by weight of the pigment(s) as indicated above, 1–15%, preferably, 2–10% by weight of the dispersant, and 1–10%, preferably, 2–5% by weight of the resin.

An organic solvent having a relatively low volatility is suitably selected as the ink solvent. The low-volatile organic solvent is required to thoroughly dissolve the above components of the ink composition other than the pigments, and also serve as a wetting agent for preventing clogging of jet nozzles formed through the printhead of the ink jet printer. Further, the solvent desirably has a surface tension of not higher than 37 dyn/cm, so that the ink is rapidly absorbed into the paper substrate and rapidly dried. It is also desirable to use a solvent which has a relatively high flashing point, small odor, and a vapor pressure of not higher than 10 mmHg at 20° C. Such a solvent may be selected from propylene glycol and its derivatives, aliphatic hydrocarbons, and dibasic acid esters, for example. More specifically, propylene glycol and its derivatives include propylene glycol, dipropylene glycol, tripropylene glycol, propylene glycol monomethyl ether, dipropylene glycol monomethyl ether, tripropylene glycol monomethyl ether, propylene glycol-n-butyl ether, dipropylene glycol-n-butyl ether, tripropylene glycol-n-butyl ether, propylene glycol methyl ether acetate, propylene glycol diacetate, and polypropylene glycol. The aliphatic hydrocarbons include IP solvent available from Idemitsu Petrochemical Co., Ltd., Japan, ISOSOL available from Nippon Petrochemicals Co., Ltd., Japan, ISOPAR available from Exxon Chemical Japan Ltd., Japan, and SHELLSOL available from Showa Shell Sekiyu K.K., Japan, for example. The dibasic acid esters include DBE available from Du Pont Japan Ltd., Japan, and IMSOL R available from ZENECA Colours, Japan.

There will be hereinafter described five examples of the present invention, and nine comparative examples. In Examples 1–5 and Comparative Examples 1–7, the same materials, other than a coloring agent (carbon black), were used in the same amounts to produce respective inks. It is to be understood that the coloring agent and other additives are not limited to those used in these examples. In Comparative Examples 8 and 9, the solvents were prepared to have different surface tensions and vapor pressures.

EXAMPLE 1

A solvent was prepared from tripropylene glycol monomethyl ether, which has a surface tension of 30.7 dyn/cm at 25° C., and a vapor pressure of 0.02 mmHg at 20° C. Then, 3 parts by weight of a resin and 8 parts by weight of a dispersant were dissolved in 78 parts by weight of the above solvent, and 11 parts by weight of carbon black (#2650 available from Mitsubishi Kasei Corporation, Japan) was added and tentatively mixed with the other components. The resin was a maleic acid resin, MALKYD No. 1 available from Arakawa Chemical Industries, Ltd., Japan, and the dispersant was prepared from a high molecular copolymer including a functional group which has a strong affinity for the pigment, more specifically, Disperbyk-163 available from BYK-Chemie GmbH, Germany. Then, the pigment was dispersed for 30 min. in a beads mill, using 1 mm-diameter beads, while the mill was rotated at 4000 rpm. In this manner, there was obtained an ink which contained pigment particles having an average particle size of 0.48 μm.

The thus obtained ink was used in an ink jet printhead having shear mode actuators, as disclosed in U.S. Pat. No. 5,016,028, to effect ink jetting operations, at respective rates of 25 pl, 50 pl and 80 pl, where pl (picoliter, i.e., $10^{-12}$l) is a unit of the volume of the ink which was ejected from a nozzle of the printhead each time an actuator corresponding to the nozzle is energized. In any case, the ink was stably jetted or ejected from the printhead toward a paper, and was rapidly dried on the paper, assuring good print quality. The ink produced in the above manner was stored for 6 months at 70° C., or stored for one year at 50° C., and no sedimentation of the pigment particles was found in either case.

In the present example, the ink volume (pl) per energization of the actuator was changed by changing the level of a voltage for generating a pressure for jetting the ink droplets from the printhead. However, the ink volume may also be changed by using ink jet printheads having different sizes of nozzles, or different sizes of ink chambers in which the ink jetting pressure is built up. It is also possible to change the time duration in which a voltage for generating the ink jetting pressure is applied to the relevant actuator.

EXAMPLE 2

An ink having the same composition as that of Example 1 was prepared in the above-described manner, except that the pigment was dispersed in the solvent for 45 min., to provide pigment particles having an average particle size of 0.4 µm. The ink was used in the ink jet printhead as described above, to effect ink jetting operations, at respective rates of 12 pl, 40 pl and 85 pl per energization of the actuator. In any case, the ink was stably jetted or ejected from the printhead toward a paper, and was rapidly dried on the paper, assuring good print quality. The ink produced in the above manner was stored for 6 months at 70° C., or stored for one year at 50° C., and no sedimentation of the pigment particles was found in either case.

EXAMPLE 3

An ink having the same composition as that of Example 1 was prepared in the above-described manner, except that the pigment was dispersed in the solvent for 4 hours, to provide pigment particles having an average particle size of 0.25 µm. The ink was used in the ink jet printhead as described above, to effect ink jetting operations, at respective rates of 12 pl, 35 pl and 70 pl. In any case, the ink was stably jetted or ejected from the printhead toward a paper, and was rapidly dried on the paper, assuring good print quality. The ink produced in the above manner was stored for 6 months at 70° C., or stored for one year at 50√ C., and no sedimentation of the pigment particles was found in either case.

EXAMPLE 4

3 parts by weight of a maleic acid resin (MALKYD No. 1 available from Arakawa Chemical Industries, Ltd.), and 8 parts by weight of a dispersant were dissolved in 78 parts by weight of a solvent prepared from tripropylene glycol monomethyl ether, and 11 parts by weight of carbon black (Printex 150T, available from Degussa Japan Co., Ltd.) was added and tentatively mixed with the other components. The dispersant was prepared from a high molecular copolymer including a functional group which has a strong affinity for the pigment, more specifically, Disperbyk-163 available from BYK-Chemie GmbH. Then, the pigment was dispersed for 4 hours, in a beads mill, using 1 mm-diameter beads, while the mill was rotated at 4000 rpm. In this manner, there was obtained an ink which contained pigment particles having an average particle size of 0.15 µm. The thus obtained ink was used in the ink jet printhead as described above, to effect ink jetting operations, at respective rates of 12 pl, 30 pl and 60 pl. In any case, the ink was stably jetted or ejected from the printhead toward a paper, and was rapidly dried on the paper, assuring good print quality. The ink produced in the above manner was stored for 6 months at 70° C., or stored for one year at 50° C., and no sedimentation of the pigment particles was found in either case.

EXAMPLE 5

3 parts by weight of a maleic acid resin (MALKYD No. 1 available from Arakawa Chemical Industries, Ltd.), and 8 parts by weight of a dispersant were dissolved in 78 parts by weight of a solvent prepared from tripropylene glycol monomethyl ether, and 11 parts by weight of carbon black (#850, available from Mitsubishi Kasei Corporation) was added and tentatively mixed with the other components. The dispersant was prepared from a high molecular copolymer including a functional group having a strong affinity for the pigment, more specifically, Disperbyk-163 available from BYK-Chemie GmbH. Then, the pigment was dispersed for 6 hours, in a beads mill, using 0.5 mm-diameter beads, while the mill was rotated at 4000 rpm. In this manner, there was obtained an ink which contained pigment particles having an average particle size of 0.07 µm. The thus obtained ink was used in the ink jet printhead as described above, to effect ink jetting operations, at respective rates of 12 pl, 30 pl and 55 pl. In any case, the ink was stably jetted or ejected from the printhead toward a paper, and was rapidly dried on the paper, assuring good print quality. The ink produced in the above manner was stored for 6 months at 70° C., or stored for one year at 50° C., and no sedimentation of the pigment particles was found in either case.

COMPARATIVE EXAMPLE 1

3 parts by weight of a maleic acid resin (MALKYD No. 1 available from Arakawa Chemical Industries, Ltd.), and 8 parts by weight of a dispersant were dissolved in 78 parts by weight of a solvent prepared from tripropylene glycol monomethyl ether, and 11 parts by weight of carbon black (#2650, available from Mitsubishi Kasei Corporation) was added and tentatively mixed with the other components. The dispersant was prepared from a high molecular copolymer including a functional group having a strong affinity for the pigment, more specifically, Disperbyk-163 available from BYK-Chemie GmbH. Then, the pigment was dispersed for 15 min., in a beads mill, using 1 mm-diameter beads, while the mill was rotated at 4000 rpm. In this manner, there was obtained an ink which contained pigment particles having an average particle size of 0.6 µm. The thus obtained ink was used in the ink jet printhead as described above, to effect ink jetting operations, at respective rates of 5 pl, 30 pl, 60 pl, 100 pl and 120 pl. In any case, the ink was unstably jetted from the printhead, producing unsatisfactory images. A printed image produced at the rate of 120 pl suffered from excessive blurring. Further, sedimentation of the pigment particles was found after the ink was stored for 6 months at 70° C., or stored for one year at 50° C.

COMPARATIVE EXAMPLE 2

The ink obtained in Example 1, having the average particle size of 0.48 µm, was jetted from the ink jet printhead as described above, at the rates of 10 pl and 100 pl. The ink jetting operation was unstable at the rate of 10 pl, and a printed image obtained at the rate of 100 pl suffered from excessive blurring.

COMPARATIVE EXAMPLE 3

The ink obtained in Example 2, having the average particle size of 0.4 μm, was jetted from the ink jet printhead as described above, at the rates of 5 pl and 100 pl. The ink jetting operation was unstable at the rate of 5 pl, and a printed image obtained at the rate of 100 pl suffered from excessive blurring.

COMPARATIVE EXAMPLE 4

The ink obtained in Example 3, having the average particle size of 0.25 μm, was jetted from the ink jet printhead as described above, at the rates of 5 pl and 80 pl. The density of a printed image obtained at the rate of 5 pl was undesirably low, specifically, less than 1 OD (optical density) level. In this regard, the printing density is generally considered to be good when the OD level is 1.2 or greater. A printed image obtained at the rate of 80 pl suffered from excessive blurring.

COMPARATIVE EXAMPLE 5

The ink obtained in Example 4, having the average particle size of 0.15 μm, was jetted from the ink jet printhead as described above, at the rates of 5 pl and 70 pl. The density of a printed image obtained at the rate of 5 pl was undesirably low, specifically, less than 1 OD level. A printed image obtained at the rate of 70 pl suffered from excessive blurring.

COMPARATIVE EXAMPLE 6

The ink obtained in Example 5, having the average particle size of 0.07 μm, was jetted from the ink jet printhead as described above, at the rates of 5 pl and 60 pl. The density of a printed image obtained at the rate of 5 pl was undesirably low, specifically, less than 1 OD level. A printed image obtained at the rate of 60 pl suffered from excessive blurring.

COMPARATIVE EXAMPLE 7

3 parts by weight of a maleic acid resin (MALKYD No. 1 available from Arakawa Chemical Industries, Ltd.), and 8 parts by weight of a dispersant were dissolved in 78 parts by weight of a solvent prepared from tripropylene glycol monomethyl ether, and 11 parts by weight of carbon black (#960, available from Mitsubishi Kasei Corporation) was added and tentatively mixed with the other components. The dispersant was prepared from a high molecular copolymer including a functional group having a strong affinity for the pigment, more specifically, Disperbyk-163 available from BYK-Chemie GmbH. Then, the pigment was dispersed for 10 hours, in a beads mill, using 0.5 mm-diameter beads, while the mill was rotated at 4000 rpm. In this manner, there was obtained an ink which contained pigment particles having an average particle size of 0.045 μm. The thus obtained ink was used in the ink jet printhead as described above, to effect ink jetting operations, at respective rates of 5 pl, 12 pl, 30 pl, 50 pl and 60 pl. A printed image produced at the rate of 60 pl suffered from excessive blurring. In the other cases, the density of printed images was undesirably low, specifically, less than 1 OD level. Sedimentation of the pigment particles was found after the ink produced in the above manner was stored for 6 months at 70° C., or stored for one year at 50° C.

COMPARATIVE EXAMPLE 8

A solvent was prepared from propylene glycol phenyl ether, which has a surface tension of 39.8 dyn/cm at 25° C., and a vapor pressure of 0.01 mmHg at 20° C. Then, 3 parts by weight of a maleic acid resin (MALKYD No. 1 available from Arakawa Chemical Industries, Ltd.), and 8 parts by weight of a dispersant were dissolved in 78 parts by weight of the above solvent, and 11 parts by weight of carbon black (Printex 150T, available from Degussa Japan Co., Ltd.) was added and tentatively mixed with the other components. The dispersant was prepared from a high molecular copolymer including a functional group which has a strong affinity for the pigment, more specifically, Disperbyk-163 available from BYK-Chemie GmbH. Then, the pigment was dispersed for 4 hours, in a beads mill, using 0.5 mm-diameter beads, while the mill was rotated at 4000 rpm. In this manner, there was obtained an ink which contained pigment particles having an average particle size of 0.12 μm. The thus obtained ink was used in the ink jet printhead as described above, to effect ink jetting operations, at respective rates of 12 pl, 30 pl and 50 pl. In any case, the ink deposited on the paper was slowly dried, and smudged or contaminated a hand when a printed surface of the paper was touched by the hand just after the printing. Sedimentation of the pigment particles was found after the ink produced in the above manner was stored for 6 months at 70° C., or stored for one year at 50° C.

COMPARATIVE EXAMPLE 9

A solvent was prepared from methyl ethyl ketone, which has a surface tension of 24.6 dyn/cm at 20° C., and a vapor pressure of less than 71.2 mmHg at 20° C. Then, 3 parts by weight of a maleic acid resin (MALKYD No. 1 available from Arakawa Chemical Industries, Ltd.), and 8 parts by weight of a dispersant were dissolved in 78 parts by weight of the above solvent, and 11 parts by weight of carbon black (Printex 150T, available from Degussa Japan Co., Ltd.) was added and tentatively mixed with the other components. The dispersant was prepared from a high molecular copolymer including a functional group having a strong affinity for the pigment, more specifically, Disperbyk-163 available from BYK-Chemie GmbH. Then, the pigment was dispersed for 4 hours, in a beads mill, using 0.5 mm-diameter beads, while the mill was rotated at 4000 rpm. In this manner, there was obtained an ink which contained pigment particles having an average particle size of 0.13 μm. When the thus obtained ink was used in the ink jet printhead as described above, the ink was immediately dried at nozzles of the printhead, while being ejected from ink chambers behind the nozzles, thus making it impossible to jet or expel the ink from the printhead. No sedimentation of the pigment particles was found after the ink was stored for 6 months at 70° C., or stored for one year at 50° C.

It will be understood from the above description that the inks according to Comparative Examples 1–7 resulted in excessive blurring or undesirably low density (OD level) of printed images, unstable ink jetting operations, and sedimentation of the pigment particles after long-term storage. The ink according to Comparative Example 8, having the surface tension of 39.8 dyn/cm, was slowly dried on the paper. The ink according to Comparative Example 9, having the vapor pressure of less than 71.2 mmHg, was dried at the nozzles of the printhead, and thus was not able to be jetted or ejected out of the printhead. The inks according to Examples 1–5 of the present invention were rapidly dried on the papers, but not dried at the jet nozzles of the ink jet printhead, thus avoiding clogging of the nozzles. These inks also enabled good ink jetting performance, and assured good print quality, and high stability even after the inks were stored for a long period of time. Similar good results were obtained with respect to other examples of inks, which were produced using low-volatile organic solvents (other than that used in Examples 1–5), which had the surface tension of 37 dyn/cm or lower and the vapor pressure of 10 mmHg or lower at 20° C. This means that the Comparative Examples 8 and 9 showed slow drying of the ink on the paper, and undesirable drying of the ink at the nozzles of the printhead, respectively, since the surface tension of the solvent used for Comparative Example 8 was higher than 37 dyn/cm, and the vapor pressure of the solvent used for Comparative Example 9 was higher than 10 mmHg at 20° C.

The graph of FIG. 1 shows the relationship between the average particle size of the pigment particles, and the volume (pl) of the ink ejected from one nozzle of the ink jet printhead per energization of the corresponding actuator, with respect to the respective inks according to Examples 1–5 and Comparative Examples 1–7. Where X (μm) represents the average particle size of the pigment particles, and Y (pl) represents the volume of the ink ejected at a time, the results of Examples 1–5 lie within an area which is surrounded by line 10 (X=0.5), line 20 (Y=100X+50), line 30 (X=0.05), line 40 (Y=10) and line 50 (Y=100X−30). That is, the inks according to Examples 1–5 satisfy all of the following conditions: $0.05 \leq X \leq 0.5$, $10 \leq Y$, and $100X-30 \leq Y \leq 100X+50$. The inks according to Comparative Examples 1–7 do not satisfy the above conditions.

Since the ink produced according to the present invention satisfies the above conditions: $0.05 \leq X \leq 0.5$, $10 \leq Y$, and $100X-30 \leq Y \leq 100X+50$, the ink jet print head is capable of jetting the ink toward a paper, with high stability, to produce high quality images, assuring rapid drying of the ink on the paper. The ink of the present invention is also highly stable as it is stored for a long period of time.

Further, the ink solvent having the surface tension of not higher than 37 dyn/cm allows rapid drying of the ink on the paper. Moreover, the ink solvent having the vapor pressure of not higher than 10 mmHg at 20° C. prevents the ink from drying at the nozzles of the ink jet printhead, to thus avoid clogging of the nozzles.

While the beads mill was used for dispersing the pigment in Examples 1–5 and Comparative Examples 1–9, ball mill, sand mill, attrition mill, roller mill, agitator, Henshel type mixer, colloid mill, ultrasonic homogenizer, extra-high-voltage homogenizer, or pearl mill, for example, may be used for dispersing the pigment.

While the ink jet printhead having shear mode actuators, as disclosed in U.S. Pat. No. 5,016,028, was used in all the above examples, other ink jet printhead, such as a Kyser type as disclosed in U.S. Pat. No. 4,339,763, or a thermal head type as disclosed in U.S. Pat. No. 5,159,349, may be used to evaluate the characteristics of the inks. In this case, similar results as obtained in the respective examples were obtained.

What is claimed is:

1. An ink usable with an ink jetting device for jetting the ink through a nozzle at a volume Y, measured in picoliters, each time the ink jetting device is energized so as to effect printing on a recording medium, said ink comprising a pigment as a coloring agent, and a non-aqueous solvent as an ink solvent, said pigment comprising particles having an average particle size of X μm, wherein X is selected to satisfy the following formulas:

$$0.05 \leq X \leq 0.5,$$

$$10 \leq Y \leq 100X+50, \text{ and}$$

$$100X-30 \leq Y.$$

2. An ink according to claim 1, wherein said non-aqueous solvent comprises a low-volatile organic solvent having a surface tension of not higher than 37 dyn/cm, and a vapor pressure of not higher than 10 mmHg at 20° C.

3. An ink according to claim 2, wherein said low-volatile organic solvent is selected from propylene glycol and its derivatives.

4. An ink according to claim 2, wherein said low-volatile organic solvent is selected from aliphatic hydrocarbons.

5. An ink according to claim 2, wherein said low-volatile organic solvent is selected from dibasic acid esters.

6. An ink according to claim 1, further comprising a surfactant and a resin, and wherein said pigment, said surfactant and said resin are contained in respective amounts of 3–10% by weight, 1–15% by weight, and 1–10% by weight.

7. A method for jetting an ink to print an image on a recording medium, comprising selecting an ink comprising a pigment as a coloring agent and a non-aqueous solvent as an ink solvent, said pigment comprising particles having an average particle size of X μm, and selectively jetting a volume Y of the ink, measured in picoliter (pl), to print the image, said particle size X of said ink being selected to satisfy the following formulas:

$$0.5 \leq X \leq 0.5,$$

$$10 \leq Y \leq 100X+50, \text{ and}$$

$$100X-30 \leq Y.$$

* * * * *